Dec. 8, 1936.  L. E. JOHNSON ET AL  2,063,439
TENSIONING DEVICE FOR ANTISKID ARMOR
Filed Dec. 18, 1935
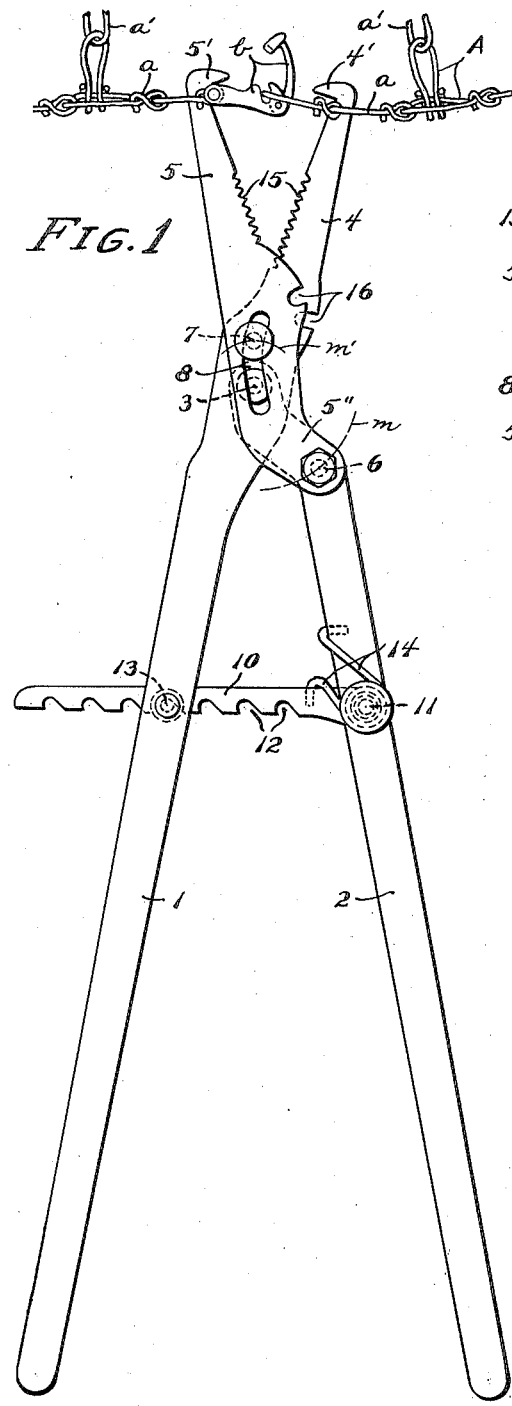
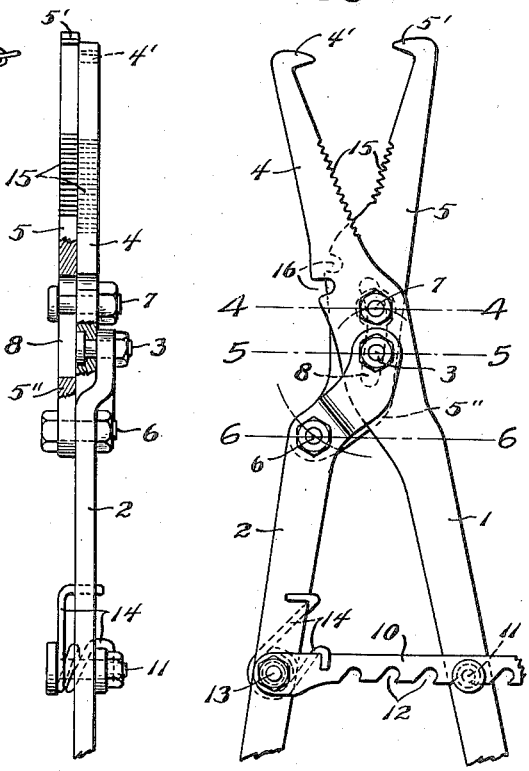
Fig. 4
Fig. 5
Fig. 6
Inventors
L. E. JOHNSON
J. K. JOHNSON
B. H. SHAVER
By Robb & Robb Attorneys Patented Dec. 8, 1936

2,063,439

UNITED STATES PATENT OFFICE 2,063,439

TENSIONING DEVICE FOR ANTISKID ARMOR

Lynn E. Johnson, Canastota, James Kenneth Johnson, Oneida, and Burr H. Shaver, Cazenovia, N. Y.

Application December 18, 1935, Serial No. 55,098

10 Claims. (Cl. 254—78)

This invention relates to a tensioning device adapted to be used more particularly for tightening anti-skid armor around and upon the tires of automobile truck wheels, but it will be obvious from the following description that it may be used for many other purposes.

The armor most commonly used upon auto truck wheels preferably comprises a pair of similar side chains and cross chains connecting the side chains at regular intervals throughout their lengths, together with suitable fastener links for connecting and disconnecting the ends of the corresponding side chains as may be necessary for placing and removing the armor upon and from the tire.

This armor is usually placed by hand around and upon the periphery of the tire with the side chains at the inner and outer sides thereof respectively and the cross chains extended across said periphery, whereupon the end links of the inner side chains, which are then more or less slack and loose, may be attached by hand to each other through the usual fastening device.

It thus becomes necessary to draw the ends of the outer chain toward each other with sufficient force to properly tighten the entire armor upon the wheel ready for use, and we have found that it is extremely difficult, if not practically impossible, to carry out this latter operation by hand without the aid of extra mechanical power.

The main object of the invention is to provide a simple but powerful hand-operated tensioning device having opposed jaws adapted to be actuated through the medium of a differential leverage system for engaging and drawing the ends of the outer side chain toward each other in such manner as to tighten the entire armor upon the tire and at the same time to permit said ends to be easily attached to each other by the usual fastening means.

Another object is to accelerate the initial closing movement of the link-engaging jaws and to gradually increase the leverage of said jaws upon the armor during said closing movement, so that the final tightening of the armor upon the tire may be conveniently and expeditiously accomplished with a minimum manual exertion.

A further object is to provide releasable means for automatically locking the tensioning device in its armor-tightening position.

Another object is to equip the device with means for cutting and forming certain parts of the armor as may be required for repairs or replacements.

Other objects and uses relating to specific parts of the tensioning device will be brought out in the following description.

In the drawing:

Figure 1 is a front face view of a tensioning device embodying the various features of the invention, showing portions of the adjacent ends of the outer side chain and adjacent portions of the cross chains of an anti-skid armor as used on auto truck wheels, the tensioning device being in position for drawing the ends of the armor together preparatory to attaching them to each other;

Figure 2 is a rear face view of the same tensioning device, except that the outer ends of the hand levers are broken away;

Figure 3 is an edge view, partly in section, of the parts shown in Figure 2;

Figures 4, 5, and 6 are enlarged transverse sectional views, taken respectively on lines 4—4, 5—5 and 6—6, Figure 2.

The armor, as A, may be of any well-known construction, preferably consisting of opposite side chains $a$ and cross chains $a'$ connecting the side chains at regular intervals throughout their lengths, together with the conventional fastening members, as $b$, for releasably connecting the links at or near the ends of the side chains, it being understood that this armor will be placed by hand over and upon the periphery of the tire with one of the side chains at the inner side of the wheel, and the other side chain, as $a$, at the outer side of the wheel, and that the ends of the inner side chain may first be conveniently attached to each other through their fastening members by reason of the fact that the entire armor is then more or less slack and loose upon the tire. The tensioning device may then be engaged with the end links of the outer side chain and operated with considerable force to draw the ends of the armor into sufficiently close relation to enable the fastening members $b$ to be attached to each other for releasably locking the armor in its adjusted position upon the wheel.

As illustrated, this tensioning device comprises cooperative handle bars 1 and 2 pivoted to each other near one end by means of a pivotal bolt 3 so that either or both of the handle bars may be moved independently or simultaneously in reverse directions about the axis of the pivotal bolt 3, the handle bar 1 being extended a relatively short distance beyond the pivotal bolt 3 to form an armor-engaging jaw 4 having a hook-shaped extremity 4' adapted to enter one of the links of the outer side chain near the end thereof to assist in drawing the ends of the armor toward each other in a manner hereinafter described.

The pivotal end of the handle bar 2 is offset axially of the pivotal bolt 3 a distance corresponding to the thickness of the handle bar 1 so that the adjacent portions of the handle bars may overlap one upon the other and permit said handle bars to be opened and closed in approximately the same plane at right angles to the axis of the pivotal bolt. The handle bar 1 and its jaw 4 are rigidly united to and preferably formed integral with each other to constitute what may be termed a jaw lever, in which the jaw 4 at one side of the pivot 3 is relatively short as compared with the length of the handle bar at the opposite side of said pivot, the object of which is to obtain a maximum leverage upon the corresponding end of the armor during the closing operation of the tensioning device.

An additional armor-engaging jaw 5 is extended across the face of the jaw 4 at the side thereof opposite the adjacent end of the handle bar 2 so as to intersect the jaw 4 between the pivotal bolt 3 and nib 4', and is preferably made in the form of a bell-crank lever having a relatively long arm provided with a hook-shaped extremity 5' and a relatively short arm, as 5", pivoted by means of a pivotal bolt 6 to the handle bar 2 a relatively short distance from the pivotal bolt 3 and preferably at the handle side thereof, so that it may be free to move about the axis of the pivotal bolt 6 in a manner presently described.

Suitable means is provided whereby the initial closing movement of the jaw 5 from its extreme open position will be more rapid than its final closing movement, for the purpose of rapidly taking up any undue slack or looseness which may exist in the armor preparatory to final tightening of the same upon the tire, said means being also adapted to gradually increase the leverage of the tensioning device upon the armor to effect the final tightening of the armor upon the tire with a minimum manual exertion.

For these latter purposes, the jaw 4 is provided with a relatively fixed stud 7 projecting therefrom through an elongated slot 8 in the jaw lever 5, so that the stud and opposite walls of the slot may constitute a variable fulcrum bearing between the jaw lever 5 and its opposed jaw 4, the stud 7 being located between the pivotal bolt 3 and hook-shaped extremity 4' of the jaw 4, but relatively close to said pivotal bolt.

The slot 8 in the jaw lever 5 extends lengthwise thereof between the pivot 6 and hook-shaped extremity 5', and is of about the same transverse width as the portion of the stud 7 which it engages, the length of the slot being considerably greater than its width and sufficient to allow the jaws 4 and 5 to open and close from one extreme position to another without undue resistance.

It will be observed upon reference to Figures 1 and 2, that the stud 7 and pivot 6 are located generally at opposite sides of the pivotal connection 3 between the hand levers 1 and 2, and that the stud 7 and pivot 6 are adapted to move in arcs of different radii about the axis of the bolt 3, the radius of the arc $m$ of movement of the pivot 6 being somewhat greater than that $m'$ of the stud 7.

It therefore follows that when either of the levers 1 or 2 is rocked about the axis of their connecting pivot 3, and particularly when the lever 2 is rocked about said axis, the pivotal connection 6 between the jaw lever 5 and lever 2 will be moved in an arc about the axis of the pivotal bolt 3, thereby bringing one or the other walls of the slot 8 into fulcrum engagement with the stud 7 for rocking said jaw about the axis of the pivot 6 with a variable leverage. For example, assuming that the hook-shaped extremities 4' and 5' are engaged with the ends of the outer side chain somewhat in the manner shown in Figure 1, at which time the jaws will be open to a greater or less degree, then through the closing operation of the handle bars 1 and 2, the jaw 5 will be moved about the axis of the fulcrum stud 7, due to the movement of the pivot 6 about the axis of the pivotal bolt 3, thus causing the fulcrum point of the jaw lever 5 against the stud 7 to gradually shift farther away from the pivot 6 toward the load or point of engagement of the jaw with the work, the effect of which is to move the jaw toward its closed position with gradually increasing force as the armor is tightened upon the wheel. It will be noted that the distance between the axes of the pivot 3 and stud 7 is relatively short as compared with the distance between the axes of said pivot 3 and the pivotal connection 6 of the jaw 5 with the lever 2, so that during the initial closing movement of the hand levers 1 and 2, the jaw 5 will be operated more rapidly than during the final closing movement of said levers, and that during the final closing movement of the hand levers, the jaws will operate upon the ends of the armor for tightening the same with a maximum leverage considerably greater than that produced during the initial closing movement, all of which is highly desirable in a tensioning device of this character for the specific purpose of tightening the relatively heavy anti-skid armor upon an auto truck tire.

Suitable means is provided for holding the levers and jaws of the tensioning device in their armor-tensioning positions, and for this purpose, a pawl or detent 10 is pivoted near one end, at 11, to one of the hand levers, as 2, to extend laterally therefrom across one of the faces of the other hand lever 1, as shown more clearly in Figures 1 and 2, said pawl or detent being provided with teeth or notches 12 adapted to engage a holding pin 13 on the lever 1, the pawl or detent being normally urged into engagement with said holding pin through the medium of a spring 14, which in this instance, is coiled around the pivotal pin 11 and has its opposite ends engaged respectively with the lever 2 and pawl 10.

The adjacent edges of the intermediate portions of the jaws 4 and 5 may be utilized for temporarily gripping and holding certain parts of the armor, but are primarily for the purpose of closing the open links by which the cross chains are fastened to the side chains when renewing or replacing said cross chains, and for this purpose are serrated at 15 to firmly hold the object between the jaws.

Means is also provided for cutting certain parts or links of the armor, as may be necessary for adjustments or replacements, and for this purpose, the jaws 4 and 5 are provided near their fulcrum 3 with outwardly opening recesses movable into and out of registration with each other to form what may be deemed a shears, so that when registered with each other, certain parts, such as links, of the armor may be inserted therein preparatory to the operation of the levers for shearing the part embraced within said registering openings.

*Operation*

When the armor has been placed over and upon the tire in the manner previously mentioned, ready for final tightening, the outer ends or nibs 4' and 5' of the jaws 4 and 5 will be inserted in the links of, and near the ends of, the outer side chain *a*, after which the levers 1 and 2 will be operated usually by both hands, to effect the final closing of the jaws and resultant tightening of the armor upon the wheel.

It will be observed, however, that the leverage system of the tensioning device is not only compounded, but is also variable, the compounding of the leverage being due to the use of the semi-floating jaw 5, having a shifting fulcrum bearing against the stud 7, as it is rocked by the lever 2 from its open position towards its closed position, while at the same time, the other lever 1 is also operated towards its closed position to apply additional power to the jaw 4 during the tightening operation, it being understood that the fulcrum of the jaw lever gradually shifts from its pivotal connection with the power lever 2 towards the load or point of engagement with the work, as the hand levers are moved from their open to their closed positions.

It will also be noted that this compound differential leverage also causes the work-engaging jaws to initially draw the ends of the armor toward their tightening position with an accelerated motion to rapidly take up the slack before the final tightening or closing movement, at which time the leverage effect upon the work is greatly increased.

It is also evident that during this closing movement of the levers, and jaws actuated thereby, said levers and jaws will be held in their adjusted positions by means of the pawl or detent 10 engaging with the holding pin 13, and that after the fastening member, as b of the outer side chain of the armor has been properly interlocked with the link on the adjacent end of said armor to hold the armor in its tightened position upon the tire, the holding pawl or detent 10 may be released by hand against the action of the spring 14 to permit the tensioning device to be opened and withdrawn from engagement with the links on the armor.

The device described is particularly simple, practical and highly efficient for the work intended, but obviously, some changes may be made in the detailed construction without departing from the spirit of the invention.

What we claim as new and desire to secure by Letters Patent is—

1. A device for tightening anti-skid armor upon auto truck wheels, comprising cooperative hand levers pivoted to each other, one of said levers being extended beyond the pivot to form an armor-engaging jaw and provided with a fulcrum bearing in fixed relation to the pivot, and an additional armor-engaging jaw having sliding fulcrum engagement with said bearing and pivotally connected to the other hand lever, whereby the last-named pivot may move about the axis of the first pivot as the hand levers are closed from their open positions.

2. An armor-tensioning device as in claim 1, in which the distance between the axes of both pivots is greater than the distance between the first-named axis and the fulcrum bearing.

3. An armor-tensioning device as in claim 1, in which means is provided for temporarily holding the hand levers in their armor-tightening position preparatory to the attachment of the ends of the armor to each other.

4. An armor-tensioning device as in claim 1, in which the jaws are provided with cooperative shearing members relatively closer to the fulcrum point of engagement of the second jaw with the fulcrum bearing than the distance between said fulcrum bearing and pivotal connection of the second jaw with its hand lever.

5. An armor-tensioning device comprising cooperative hand levers pivoted to each other, one of said levers being extended beyond the pivot to form an armor-engaging jaw, said jaw having a relatively fixed fulcrum stud, a bell-crank lever pivoted to the other hand lever and extended across the first jaw beyond said stud to form a second armor-engaging jaw, said bell-crank lever having sliding fulcrum engagement with said stud as the hand levers are opened and closed.

6. A tensioning device of the character described comprising cooperative hand levers pivoted to each other, one of the levers being extended beyond the pivot to form a jaw, a second jaw pivoted to the other lever, and means actuated by the closing movement of the hand levers for engaging the second jaw at different distances from its pivotal connection with the second hand lever, and thereby varying the leverage between the jaws as the hand levers are opened and closed.

7. A device for tightening anti-skid armor upon the tires of automobile wheels comprising cooperative hand levers pivoted to each other, an armor-engaging jaw secured to one of said levers to extend beyond the pivotal connection between the levers, a bell-crank lever having one arm pivoted to the other hand lever and its other arm forming an armor-engaging jaw in opposed relation to the first-named jaw, and means for establishing sliding fulcrum relation between the bell-crank lever and first-named jaw.

8. A tensioning device of the character described comprising cooperative levers pivoted to each other, one of the levers being extended beyond the pivot to form a work-engaging jaw, a stud on said extension in fixed relation to the pivot, a bell-crank lever having one arm pivoted to the other hand lever and its other arm extending across said extension and having sliding fulcrum engagement with said stud for varying the leverage between the jaws as the hand levers are opened and closed.

9. In a tensioning device of the character described, cooperative hand levers pivoted to each other, one of the levers being extended beyond the pivot to form a work-engaging jaw, a stud secured to said extension in fixed relation to the pivot, a bell-crank lever having one arm pivoted to the other hand lever and its other arm extending across the first-named jaw in opposed relation thereto and provided with a lengthwise bearing in sliding fulcrum engagement with the stud whereby the distance between the fulcrum point and axis of the pivotal connection between the bell crank lever and second hand lever gradually increases as the hand levers close.

10. A tensioning device of the character described comprising opposed work-engaging jaws relatively slidable lengthwise, one upon the other, and having fulcrum engagement with each other, and means for opening and closing the jaws about the fulcrum and for shifting the fulcrum engagement of one jaw with the other in the direction of such sliding movement as the jaws are opened and closed.

LYNN E. JOHNSON.
JAMES KENNETH JOHNSON.
BURR H. SHAVER.